(12) United States Patent
Machado et al.

(10) Patent No.: US 8,953,944 B2
(45) Date of Patent: Feb. 10, 2015

(54) SYSTEMS AND METHODS FOR ESTABLISHING AN UNDERWATER OPTICAL COMMUNICATION NETWORK

(75) Inventors: Casey Machado, Woods Hole, MA (US); Lee Freitag, Falmouth, MA (US); Andy Bowen, Woods Hole, MA (US); Norman E. Farr, Woods Hole, MA (US)

(73) Assignee: Woods Hole Oceanographic Institution, Woods Hole, MA (US)

( * ) Notice: Subject to any disclaimer, the term of this patent is extended or adjusted under 35 U.S.C. 154(b) by 315 days.

(21) Appl. No.: 13/344,430

(22) Filed: Jan. 5, 2012

(65) Prior Publication Data

US 2012/0170935 A1 Jul. 5, 2012

Related U.S. Application Data

(60) Provisional application No. 61/430,081, filed on Jan. 5, 2011.

(51) Int. Cl.
*H04B 10/00* (2013.01)
*H04B 13/02* (2006.01)

(52) U.S. Cl.
CPC .................................. *H04B 13/02* (2013.01)
USPC ........................ 398/104; 398/115; 398/116

(58) Field of Classification Search
CPC .......... H04B 13/02; H04B 3/00; H04B 10/12; H04B 10/25; H04B 10/1121; H04B 10/1123; H04B 10/1125; H04B 10/1127; H04B 10/80; H04B 10/806; H04J 14/00; H04J 14/0227; G02B 6/4448; G02B 6/12007; H02G 15/14; H02G 9/00; H02G 9/02
USPC .................... 398/104, 105, 58, 115, 116, 117
See application file for complete search history.

(56) References Cited

U.S. PATENT DOCUMENTS

| | | | | |
|---|---|---|---|---|
| 5,883,517 | A * | 3/1999 | Broyde et al. | 324/522 |
| 2007/0183782 | A1 * | 8/2007 | Farr et al. | 398/104 |
| 2011/0055746 | A1 * | 3/2011 | Mantovani et al. | 715/771 |

* cited by examiner

*Primary Examiner* — M. R. Sedighian
(74) *Attorney, Agent, or Firm* — Douglas Denninger

(57) ABSTRACT

The systems and methods described herein provide a reconfigurable, long-range, optical modem-based underwater communication network. In particular, the network provides a low power, low cost, and easy to deploy underwater optical communication system capable of being operated at long distances. Optical modem-based communication offer high data rate, omni-directional spatial communication in the visual spectrum. The omni-directional aspect of communication is advantageous because precise alignment of communication units may not be required. The optical modems may be deployed via unmanned underwater vehicles (UUVs) and physically connected by tethers.

13 Claims, 16 Drawing Sheets

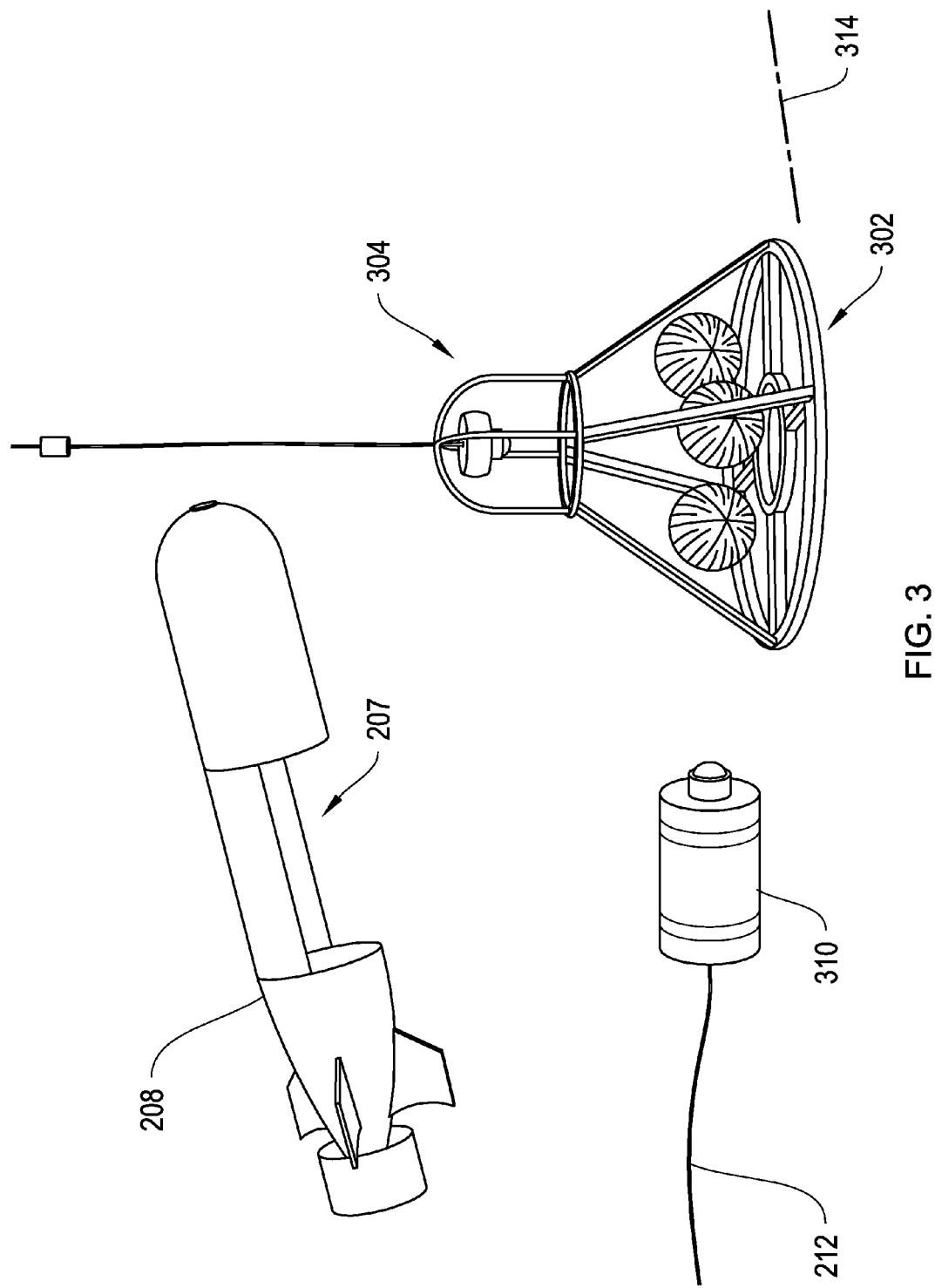

SYSTEMS AND METHODS FOR ESTABLISHING AN UNDERWATER OPTICAL COMMUNICATION NETWORK

CROSS REFERENCE TO RELATED APPLICATIONS

This application claims priority to U.S. Provisional Patent Application Ser. No. 61/430,081 filed Jan. 5, 2011, entitled "Systems and methods for establishing an underwater optical communication network," hereby incorporated by reference in its entirety.

BACKGROUND

There is an increasing demand for long-range communication systems to connect seafloor observatories spread over large portions of the earth-ocean system. Ocean observatories are deployed at the seafloor and connected by cable or buoy to surface networks. These seafloor observatories may be located many hundreds of kilometers off the coast of the nearest shore station and may be positioned at depths of over 5000 meters. Typically, the observatory has one or more network connections to shore stations through which data collected from the seafloor observatory may be passed onto the Internet and which may serve seafloor instruments with power and control commands. However, these are dedicated connections and do not offer any options for reconfigurable long-range connection of a seafloor observatory to another seafloor observatory, or another shore station.

Accordingly, there is a need for an easy to deploy underwater communication system that is readily reconfigurable.

SUMMARY

The systems and methods described herein provide a reconfigurable, long-range, optical modem-based underwater communication network. In particular, the network provides a low power, low cost, and easy to deploy underwater optical communication system capable of being operated at long distances. Optical modem-based communication offers high data rate, and omni-directional spatial communication in the visual spectrum. The omni-directional aspect of communication is advantageous because precise alignment of communication units may not be required. The optical modems may be deployed by unmanned underwater vehicles (UUVs) and physically connected by a tether (e.g., a light-weight fiber optic cable).

In one aspect, the systems and methods described herein provide for establishing an underwater optical communication link between two underwater cabled observatories that are located in two different locations. A first optical modem may be mechanically coupled by a tether to a second optical modem. The first optical modem may be disposed within an optical range of a first cabled observatory, and the second optical modem may be disposed within an optical range of a second cabled observatory. An underwater optical connection between the first cabled observatory and the second cabled observatory may be established through the first optical modem, the tether and the second optical modem. Each optical modem may communicate with the cabled observatory by diffusing electromagnetic radiation of wavelength in the optical spectrum between about 300 nm to about 800 nm.

In some embodiments, at least one of the first and second optical modems is disposed using an underwater vehicle.

In some embodiments, the optical modem communicates with a cabled observatory using a communication protocol, e.g., time division multiple access (TDMA), code division multiple axis (CDMA), space division multiple access (SDMA), frequency division multiple access (FDMA) or any other suitable communication protocol.

In some embodiments, methods are provided for detecting a fault in the underwater optical connection and determining if the fault occurs at one or more of the cabled observatories, the optical modems, and connecting tethers.

In some embodiments, a detected fault in the underwater optical connection is corrected by disposing a plurality of optical modems in place of a faulty node. For example, an underwater optical connection may be initially established between a first and a second cabled observatory via a first optical modem (disposed near the first observatory) physically connected by a tether to a second optical modem (disposed near the second observatory). If a fault is detected in the tether, the fault may be corrected by disposing a plurality of optical modems between the first optical modem and the second optical modem. If the fault is detected in the first optical modem, the fault may corrected by disposing a plurality of optical modems between the first cabled observatory and the second optical modem. If the fault is detected in the second optical modem, the fault may be corrected by disposing a plurality of optical modems between the first optical modem and the second cabled observatory. The disposed plurality of optical modems are placed within their respective optical ranges such that they form a continuous optical communication link between both ends of the plurality.

In some embodiments, each optical modem communicates on at least two different communication channels. For example, an optical modem may communicate with a first optical modem on a first communication channel, and communicate with a second optical modem on a second communication channel.

In some embodiments, a detected fault in the underwater optical connection is corrected by disposing a third optical modem within a communication range of the first optical modem, and disposing a fourth optical modem within a communication range of the second optical modem, where the third and fourth optical modems may be mechanically coupled by a tether.

In some embodiments, a detected fault in the underwater optical connection is corrected by disposing a third optical modem within a communication range of the first cabled observatory, disposing a fourth optical modem within a communication range of the second cabled observatory and retrieving the first and second optical modems that were part of the detected fault in the underwater optical connection. For example, if the fault were detected in a tether, a first optical modem connected to the tether, a second optical modem connected to the tether, and the tether itself may be retrieved.

In some embodiments, establishing the optical data connection includes determining an optical range of the first cabled observatory, and determining an optical range of the second cabled observatory.

In some embodiments, the optical communication network is extended by disposing a third optical modem within an optical range of the second cabled observatory, and disposing a fourth optical modem within an optical range of a third cabled observatory that has a location different from the first and second observatories.

In some embodiments, the optical range of an optical modem is at least about 100 meters.

In one aspect, the systems and methods described herein provide for an underwater vehicle to establish an underwater optical communication link between a first cabled observatory and a second cabled observatory. The underwater vehicle may include two optical modems, mechanically coupled by a tether. Each optical modem may include a transmitter having at least one optical source capable of emitting electromagnetic radiation of wavelength in the optical spectrum between about 300 nm to about 800 nm, and a diffuser capable of diffusing the electromagnetic radiation and disposed in a position surrounding a portion of the at least one source for diffusing the electromagnetic radiation in a plurality of directions.

In some embodiments, the tether includes a fiber optic cable, copper cable, or any other suitable type of cable.

In some embodiments, each optical modem includes at least two optical sources. A first optical source may be configured to emit electromagnetic radiation at a wavelength different from a second optical source.

In some embodiments, the underwater vehicle is configured to dispose an optical modem from an underside portion of the vehicle, and retrieve a disposed optical modem into the underside portion of the vehicle.

In some embodiments, an underwater optical modem is integrated into the underwater vehicle.

In one aspect, the systems and methods described herein provide for a system to establish an underwater optical communication link between two cabled observatories. The system may include a first underwater vehicle including an integrated first optical modem, a second underwater vehicle including an integrated second optical modem, and a tether mechanically coupled to the first and second optical modems of each underwater vehicle. Each optical modem may include a transmitter having at least one optical source capable of emitting electromagnetic radiation of wavelength in the optical spectrum between about 300 nm to about 800 nm, and a diffuser capable of diffusing the electromagnetic radiation and disposed in a position surrounding a portion of the at least one source for diffusing the electromagnetic radiation in multiple directions.

In some embodiments, the first underwater vehicle is configured to dispose a third optical modem from an underside portion of the underwater vehicle, and retrieve the disposed third optical modem into the underside portion of the first underwater vehicle. The third optical modem may be mechanically coupled to an integrated first optical modem of the first underwater vehicle.

In some embodiments, the second underwater vehicle is configured to dispose a fourth optical modem from an underside portion of the underwater vehicle, and retrieve the disposed fourth optical modem into the underside portion of the second underwater vehicle. The fourth optical modem may be mechanically coupled to an integrated second optical modem of the second underwater vehicle.

In some embodiments, an optical modem is disposed on the forward surface of the underwater vehicle.

BRIEF DESCRIPTION OF THE DRAWINGS

The following figures depict certain illustrative embodiments of the systems and methods described herein in which like reference numerals refer to like elements. These depicted embodiments may not be drawn to scale and are to be understood as illustrative and not as limiting in any way.

FIG. 3 illustrates an underwater vehicle disposing a second optical modem near a second cabled observatory in accordance with some illustrative embodiments;

DETAILED DESCRIPTION

The systems and methods described herein will be described with reference to certain illustrative embodiments. However, the systems and methods described herein is not to be limited to these illustrated embodiments which are provided merely for the purpose of describing the systems and methods and are not to be understood as limiting in anyway.

In many aspects, the systems and methods described herein include an optical modem-based underwater communication network for connecting a plurality of cabled ocean observatories having optical modems. The observatories may be deployed at certain locations underwater on the seafloor. An unmanned underwater vehicle (UUV) or similar underwater vehicle may navigate to a first observatory, determine an optical range of the first observatory's optical modem, and deploy a first optical modem within the optical range. It may be difficult to deploy the optical modem accurately within the optical range from the water surface. The UUV is better suited to navigate to the observatory and deploy the optical modem accurately within the observatory's optical range. The optical modem may be shaped or weighted such that when deployed it lands in a particular orientation. The optical modem may be tethered to the UUV via a tethering system, e.g., a micro-tethering system. The UUV may pay out a tether with the aid of the micro-tethering system as it navigates towards a second observatory. The micro-tethering system uses lightweight fiber optic cable which may allow the UUV to pay out a tether over a distance of greater than 10 km, or even 100 km.

On arriving at the second observatory, the UUV may determine an optical range of the second observatory's optical modem and deploy a second optical modem. The second optical modem may be connected via a tether to the first optical modem deployed at the first observatory. As such, the UUV may establish a communication link between the first and second observatories through the first and second optical modems connected via the tether. In some embodiments, the UUV is adapted to retrieve the first and second optical modems, and redeploy them as necessary at any of the plurality of observatories. Consequently, the UUV may establish a reconfigurable communication link between the plurality of observatories as required. In some embodiments, the UUV includes the second optical modem integrated on-board and itself lands within the optical range of the second observatory to establish a communication link. The UUV and its integrated optical modem may move to another observatory as required, and provide a reconfigurable communication link between various observatories in this manner.

Figure 1:
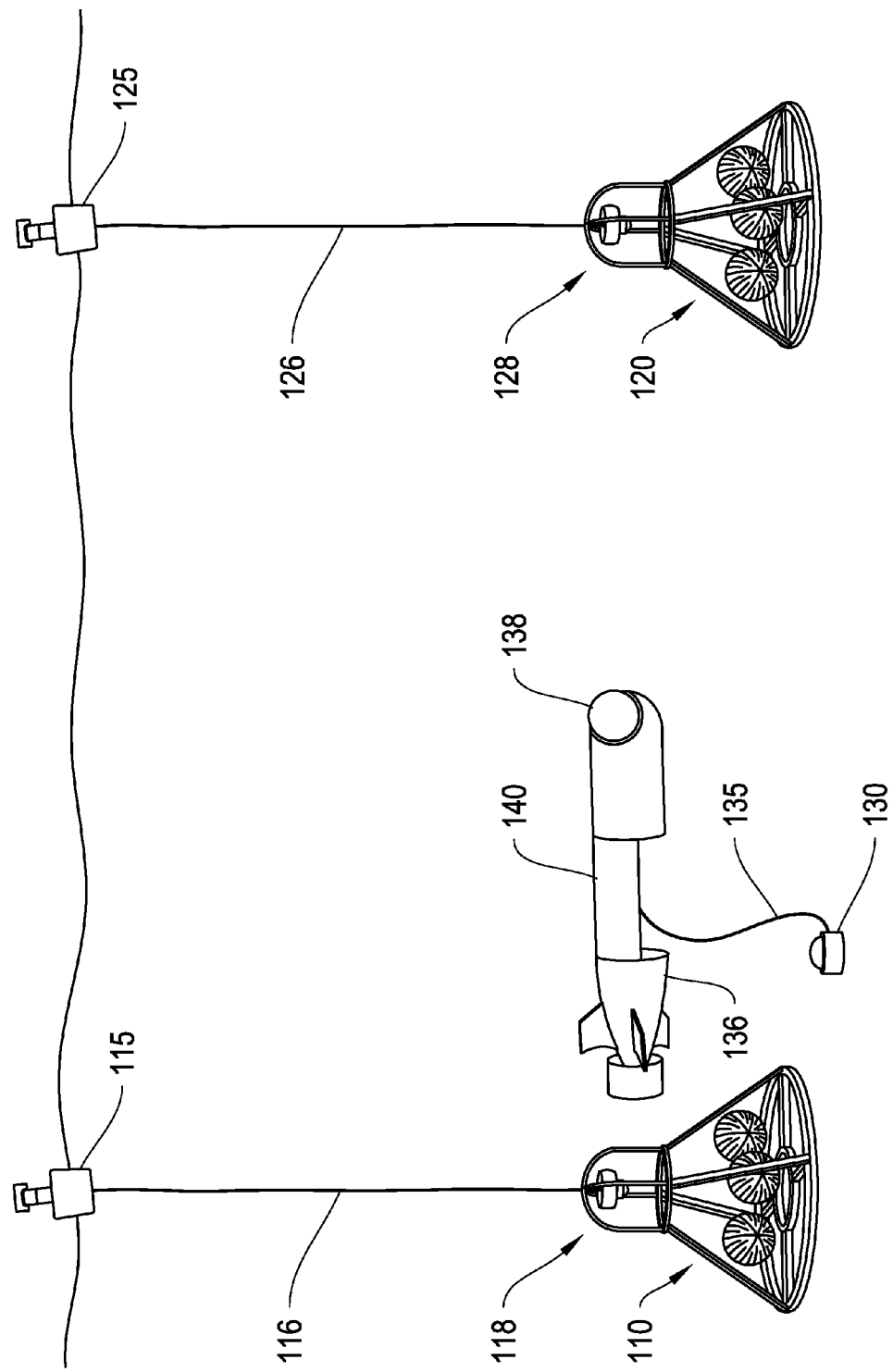
FIG. 1 illustrates an arrangement of first and second cabled observatories, and an underwater vehicle in the process of establishing an underwater optical communication link in accordance with some illustrative embodiments.

FIG. 1 illustrates an arrangement of first and second cabled observatories, and an underwater vehicle in the process of establishing an underwater optical communication link in accordance with some illustrative embodiments. Illustrated in FIG. 1 are a first cabled observatory 110, a first buoy 115, a second cabled observatory 120, a second buoy 125, and a UUV 140. The UUV 140 includes an integrated optical modem 138 and a deployable optical modem 130. The optical modem 130 is mechanically coupled to the integrated optical modem 138 via tether 135.

The first and second cabled ocean observatories may be submerged under a water body at a desired depth, resting on a sea floor or suspended in the body of water. As referred to herein, the terms "cabled ocean observatory" and "cabled observatory" may be used interchangeably. The cabled ocean observatory may be designed around either a surface buoy or a submarine fiber optic/power cable connecting one or more seafloor nodes. In some embodiments, an underwater observatory maybe a stand-alone unit that is not connected to another communication unit by a tether or a cable. The stand-alone underwater observatory may include an independent power source such as a battery to operate independently. As referred to herein, the term "seafloor node" may refer to an underwater communication unit that includes an optical modem or any other suitable communication device. The observatory may also include sensors and optical imaging systems to measure and record ocean phenomena. A cabled observatory may be connected to a surface buoy, one or more seafloor nodes by a cable, a surface ship, or a station on land. The cabled observatory 110 is connected to the surface buoy 115 by a cable 116, and second cabled observatory 120 is connected to a second surface buoy 125 by a second cable 126. In some embodiments, the cable includes a tether as described in further detail below. The cabled observatory may include an optical modem, which will be described in further detail below in reference to FIG. 5. The cabled observatory 110 includes an integrated optical modem 118, and the second cabled observatory 120 includes an integrated optical modem 128. As illustrated in FIG. 1, in some embodiments, the optical modem is oriented with a hemispherical diffuser downwards. It should be understood that in some embodiments, the optical modem may be oriented upwards, sideways, or any other suitable direction.

An optical connection may be formed between the two cabled observatories by UUV 140. As illustrated, the UUV 140 includes an integrated optical modem 138. The UUV 208 may determine a first optical range of the integrated optical modem at the first observatory. For example, the UUV may determine the first optical range by navigating toward the first cabled observatory until information is successfully exchanged between the integrated optical modem 138 of the UUV and the integrated optical modem 118 of the first cabled observatory, via a modulated optical signal. After determining the first optical range, the UUV may dispose a first optical modem 130 within the determined first optical range. The disposed optical modem 130 may be mechanically coupled to the integrated optical modem 138 by a tether 135. As referred to herein, the term "mechanically coupled" may be defined as a connection enabled by any number of connectors or cables. For example, a first end of the tether may be physically connected to the optical modem 130, and a second end of the tether may be connected to the integrated optical modem 138 through a bulkhead connector within the UUV 140. The underside 136 of UUV 140 may include a compartment that may store optical modem 130 during transit before disposal.

After disposing the optical modem 130 within a first optical range of the first cabled observatory, UUV 140 may navigate toward second cabled observatory 120 until a second optical range of the second observatory is determined. Upon determining the second optical range, the UUV 140 may maintain a position within the second optical range, and complete an optical communication link between the first cabled observatory and the second cabled observatory. In some embodiments, UUV 140 disposes a second optical modem within an optical range of a second cabled observatory 120, further described below in reference to FIG. 3.

Figure 2A:
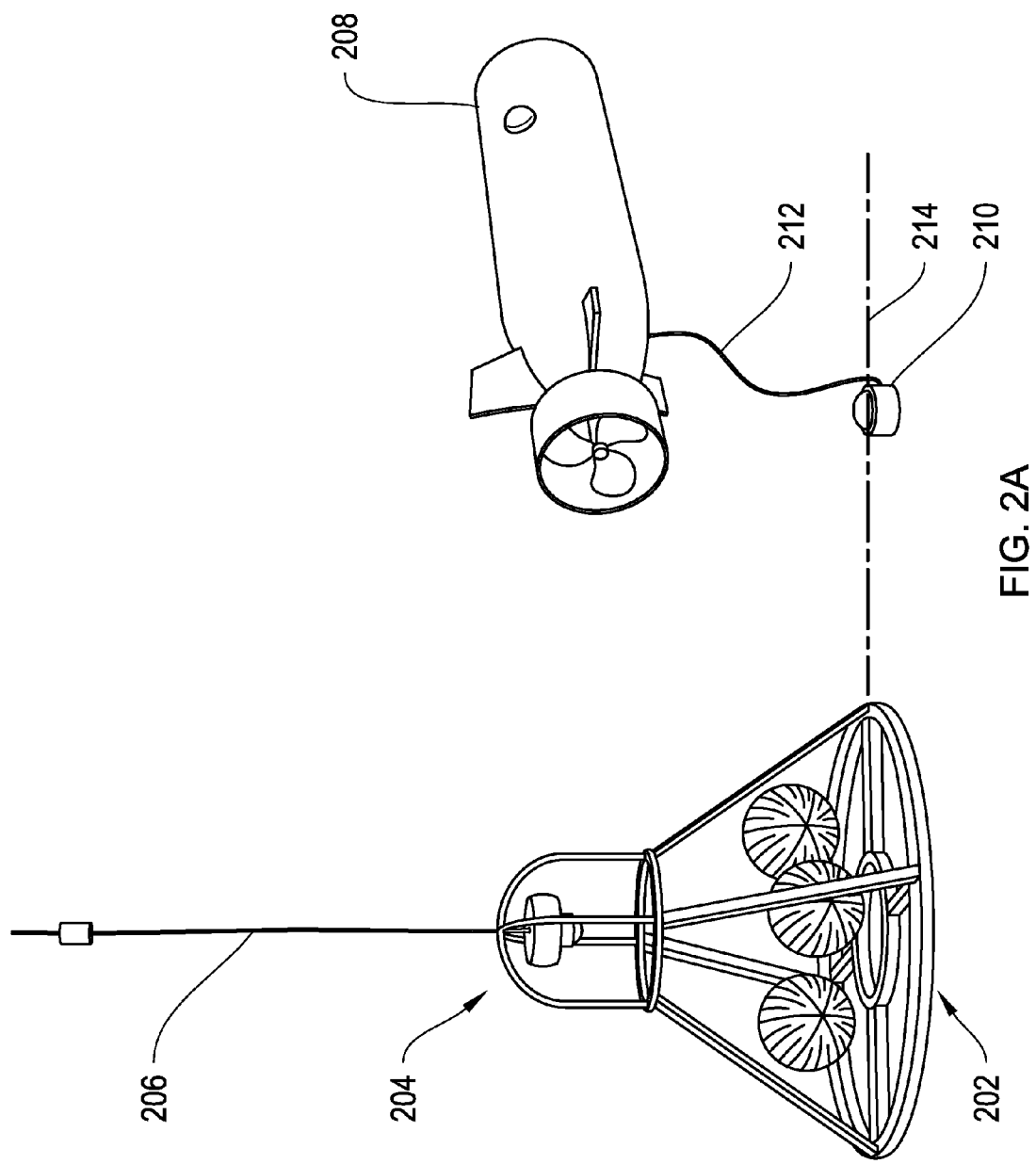
FIGS. 2A-2B illustrate an underwater vehicle disposing a first optical modem near a first cabled observatory in accordance with some illustrative embodiments.
Figure 2B:
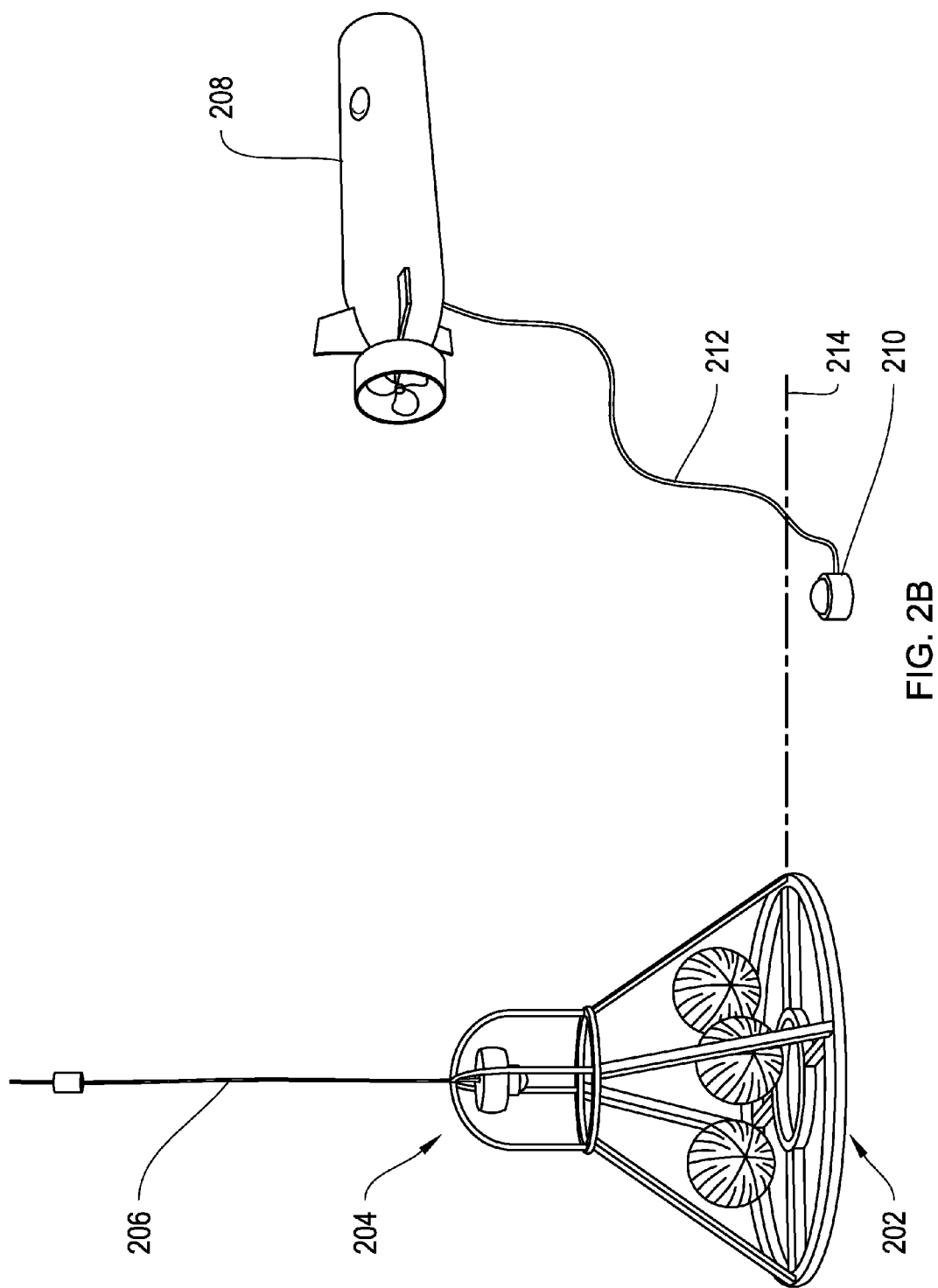

FIGS. 2A-2B illustrate an underwater vehicle 208 disposing a first optical modem 210 near a first cabled observatory 202 in accordance with some illustrative embodiments. In FIG. 2A, cabled ocean observatory 202 is submerged under a water body at a desired depth. Cable 206 extends from observatory 202 towards the surface buoy or one or more seafloor nodes. Observatory 202 includes optical modem 204 for underwater optical communication, having an optical range 214. UUV 208 passes by observatory 202 and disposes optical modem 210 within the optical range of optical modem 204. Optical modem 210 is tethered to UUV 208 via tether 212, which may include a fiber optic cable. The tethering system may be a micro-tethering system of the type described in commonly-owned U.S. Pat. No. 7,621,229, entitled "Systems and Methods for Tethering Underwater Vehicles". Once optical modem 210 is in range of optical modem 204, a communication link may be established automatically. As such, UUV 208 establishes a connection with observatory 202 via optical modems 204 and 210.

In FIG. 2B, UUV 208 begins to move away from observatory 202 and pays out tether 212 such that the optical modem 210 and UUV 208 remain tethered. For example, UUV 208 may receive instructions to navigate from observatory 202 to a second observatory (not shown). The instructions may be pre-programmed into UUV 208, or may be received by remote control. For example instructions may be received from a cable connecting UUV 208 to a surface ship (not shown), or may be received from optical communication with observatory 202.

FIG. 3 illustrates underwater vehicle 208 disposing a second optical modem 310 near a second cabled observatory 302 in accordance with some illustrative embodiments. In FIG. 3, UUV 208 arrives at another cabled ocean observatory 302, which includes an optical modem 304 having an optical range 314. UUV 208 deploys another optical modem 310 within the optical range of optical modem 304, allowing optical modem 310 to be in communication with observatory 302. Since optical modem 310 is attached to the other end of tether 212, it is also in communication with optical modem 210 from FIGS. 2A and 2B. As such, an optical modem-based underwater communication network is established between cabled ocean observatories 202 and 302 through optical modems 210 and 310 connected via tether 212. The optical modems may have batteries making them self-powered. The optical modems may conserve energy by using a modest duty cycle and low power tether.

In some embodiments, UUV 208 may include an undercarriage portion 207 that may hold one or more underwater optical modems in transit before deployment or after retrieval. In some implementations, the undercarriage portion may include a mechanical arm, not shown, used to dispose an optical modem on the sea floor. In some implementations, the UUV may include magnets used to dispose or retrieve the optical modem. For example, the mechanical arm may include electromagnets that may be used to hold an underwater optical modem during retrieval or disposal from the undercarriage portion.

In addition to providing low power communication (e.g., transmission power of about 400 mW for a range about 100 meters at a data rate of about 10 Mbit/sec, or transmission power of about 25 mW for a range about 100 meters at a data rate of about 1 Mbit/sec), fiber optic cable also may be advantageous over, for example, copper cable, since signals travel along them with minimal loss and are immune to electromagnetic interference. Furthermore, fiber optic cable may be easier to deploy underwater due to lighter weight. For example, commonly-owned U.S. Pat. No. 7,621,229, entitled "Systems and Methods for Tethering Underwater Vehicles", describes an optical fiber having a cross-section diameter of about 250 microns and the weight of about 11 km of the optical fiber in water is only about 173 g. However, the fiber optic cable may require protective covering capable of guarding against corrosion and damage from, e.g., fish bites. The fiber optic cable may be surrounded by a protective jacket layer made of, for example, plastic, or any other suitable material. Fiber optic cable 212 may extend for distances greater than 50 km, 100 km, or 200 km. Tether 212 may include a bundle of a plurality fiber optic wires.

Figure 4:
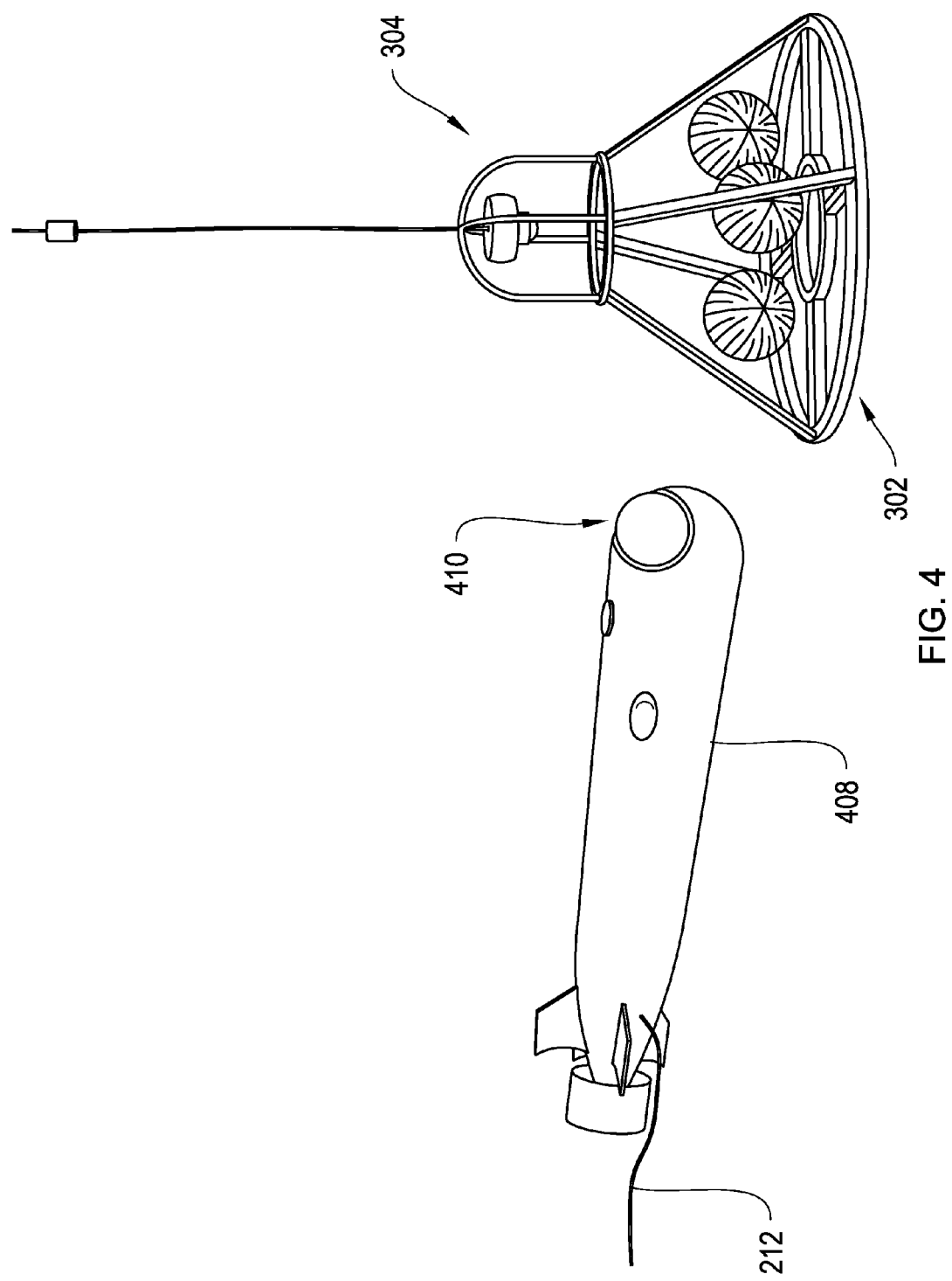
FIG. 4 illustrates an underwater vehicle including an integrated optical modem establishing an optical connection with a second cabled observatory in accordance with some illustrative embodiments.

FIG. 4 illustrates an underwater vehicle 408 including an integrated optical modem 410 establishing an optical connection with a second cabled observatory in accordance with some illustrative embodiments. FIG. 4 depicts an alternative embodiment of the UUV and attached optical modem described in FIG. 3. In FIG. 4, UUV 408 arrives at cabled ocean observatory 302, with optical modem 304 having optical range 314. UUV 408 is different from UUV 308 because instead of deploying an optical modem, UUV 408 includes an optical modem 410 integrated into the body of the UUV. UUV 408 lands within the optical range of observatory 302, and established a communication link with optical modem 304 of observatory 302. Similar to the embodiment depicted in FIG. 3, UUV 408 has a tether 212 attached to optical modem 310 at the other end of the fiber optic cable. As such, an optical modem-based underwater communication network is established between cabled ocean observatories 202 and 302 through optical modems 210 and 310 connected via tether cable 212.

The depicted embodiment of UUV 408 may allow for easy reconfiguration of the optical modem-based underwater communication network. For example, UUV 408 may alternately deploy optical modem 410 between two or more cabled observatories. Since optical modem 410 is integrated in UUV 408, there is no issue of retrieving the optical modem 410 after deployment. In some embodiments, optical modem 310 is retractable into the body of UUV 408 for easy redeployment of both ends of the optical modem-based communication link. The depicted embodiment of UUV 408 may be advantageous in circumstances where the optical modem needs to be oriented vertically or at a certain angle, as opposed to being deployed horizontally on the seafloor.

Figure 5:
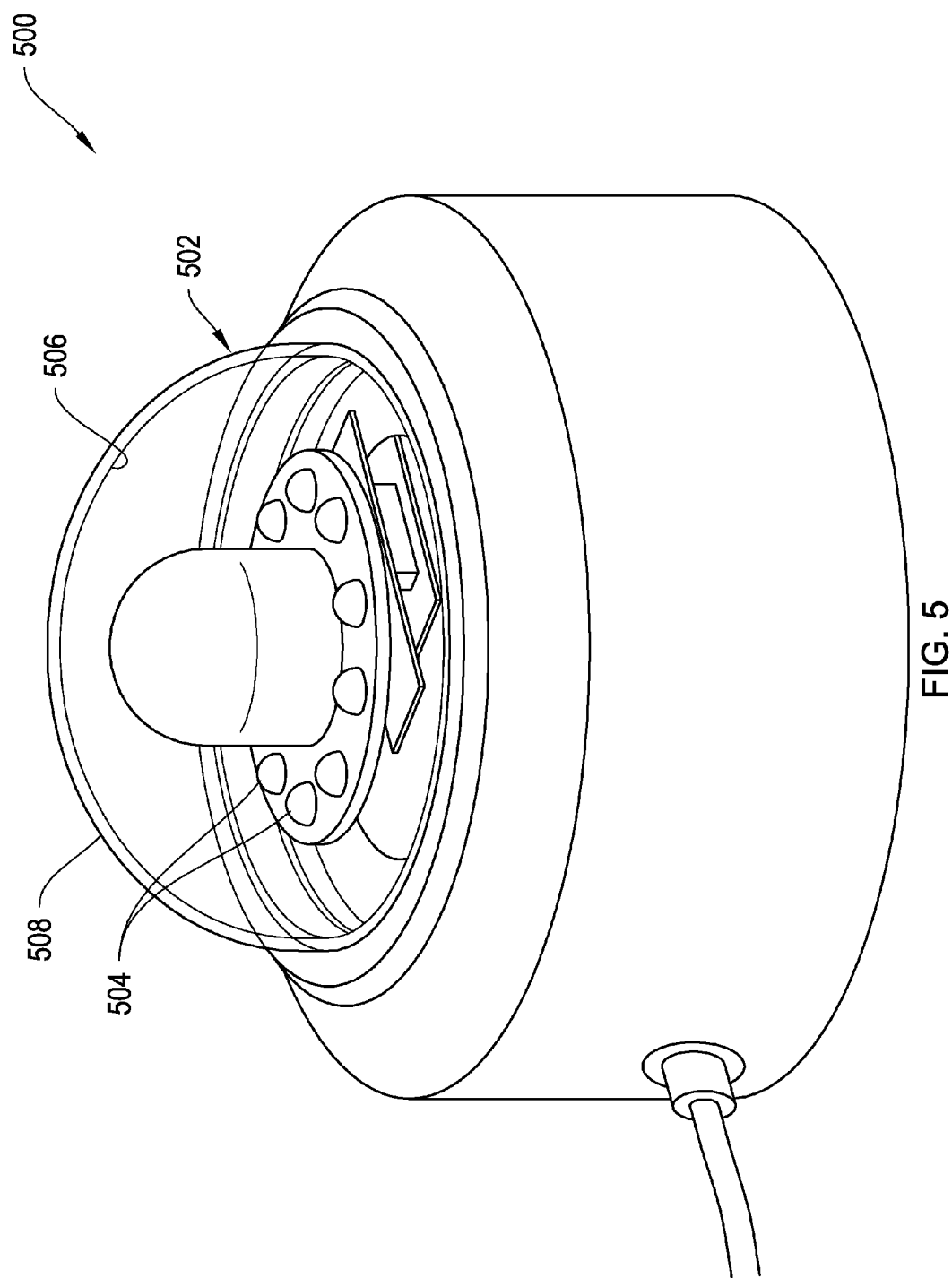
FIG. 5 illustrates an example of an underwater optical modem in accordance with some illustrative embodiments.

FIG. 5 illustrates an underwater optical modem in accordance with some illustrative embodiments. In FIG. 5, a close-up view of the optical modem is shown. Optical modem 500 includes a plurality of sources 504 disposed within a diffuser 502, which is of hemispherical shape having an inner curved surface 506 and an outer curved surface 508. Sources 504 may be disposed within hemispherical diffuser 502 such that they are located inside inner curved surface 506. In some embodiments, not shown, sources 504 are disposed in hemispherical diffuser 502 such that they are protruding from inner curved surface 506 towards outer curved surface 508. In one embodiment, source 504 includes light emitting diodes and diffuser 502 includes a lightly scattered TiO2/Silicone dome. Each of sources 504 may be individually controllable such that one or more sources 504 is used to emit electromagnetic radiation. In certain implementations, the emitted electromagnetic radiation is directed along one or more directions based at least in part on the operation of one or more sources 504. Power consumption may be controlled by the operating a specific number of sources 504 as required.

Because optical modem 500 may diffuse electromagnetic radiation in multiple directions, to avoid cross-talk and collision during communications, the optical modems may communicate using protocols such as time division multiple access (TDMA), code division multiple axis (CDMA), space division multiple access (SDMA) and frequency division multiple access (FDMA), or any other suitable protocol. Each optical modem may also be capable of communicating on a plurality of different optical communication channels. As referred to herein, the term "optical communication channel" may be defined as a different carrier wavelength of light. For example, a first optical modem and second optical modem may communicate using a first wavelength. The second optical modem and a third optical modem may communicate using a second wavelength different form the first wavelength, to avoid cross-talk of communications between the first and second optical modems and the second and third optical modems.

Figure 6:
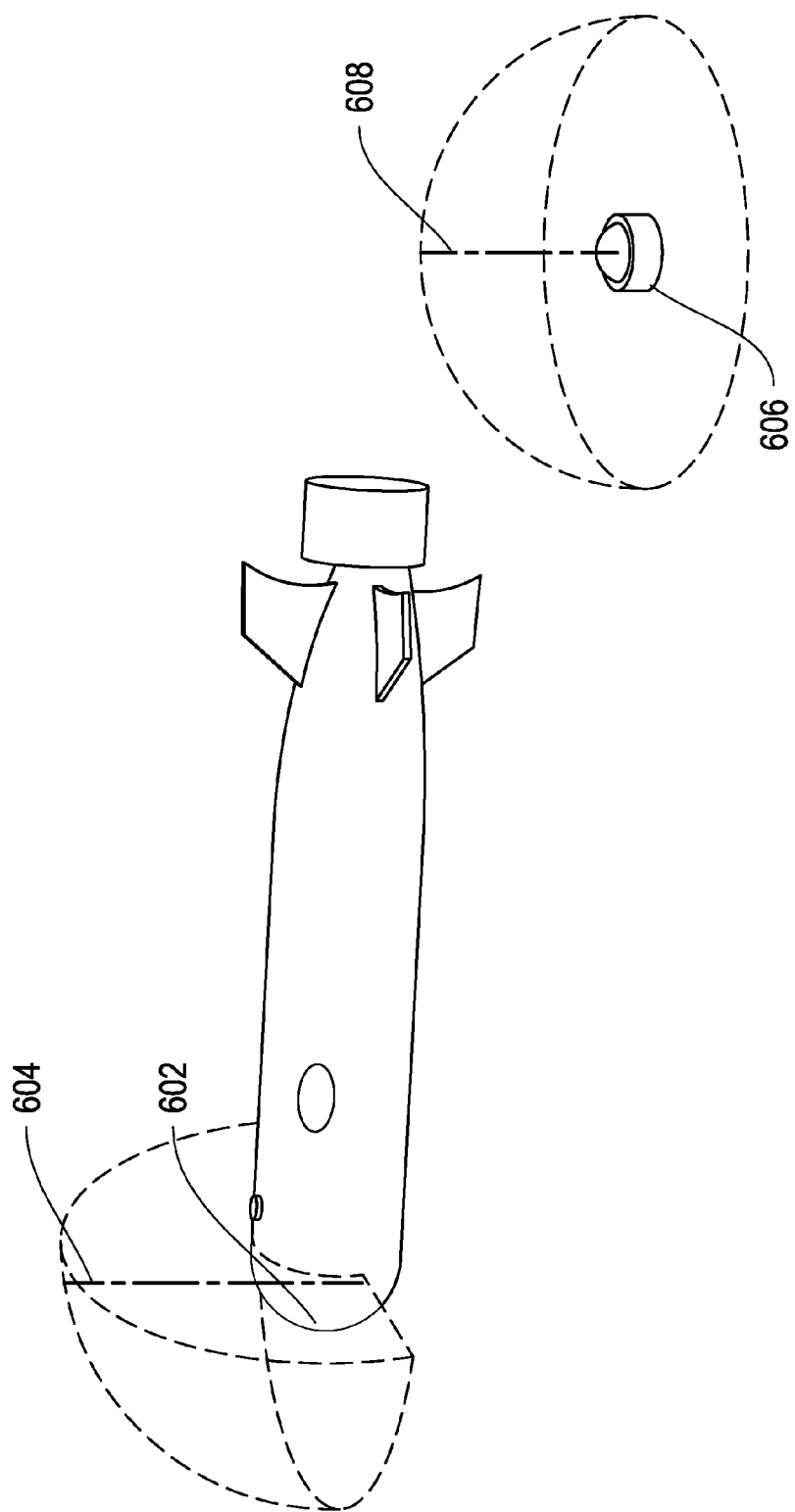
FIG. 6 illustrates optical ranges of optical modems in accordance with some illustrative embodiments.

In FIG. 6, optical ranges 604 and 608 are illustrated for optical modems 602 (similar to optical modem 410) and 606 (similar to optical modem 210). The optical range of each optical modem may be greater than 100 m. Optical modems are advantageous when compared with, e.g., inductively-coupled modems, since no physical contact is required to establish a communication link. As soon as an optical modem is in range of another optical modem, a communication link may be established automatically. Additionally, inductively coupled modems may suffer from signal attenuation in a conductive medium such as salt water. Radio frequency modems may also suffer from signal attenuation in conductive media. However, optical modems do not suffer from such drawbacks. Examples of suitable underwater optical modems may be found in commonly-owned U.S. patent application Ser. No. 11/348,726, entitled "Systems And Methods For Underwater Optical Communication" which is hereby incorporated by reference herein in its entirety.

In some embodiments, an underwater optical modem-based communication network may be established using un-tethered optical modems. A UUV may deploy a sequence of optical modems between a first cabled observatory and a second cabled observatory. The first optical modem may be deployed such that it is in optical range of the first cabled observatory. The second optical modem may be deployed such that it is communication with the first optical modem, and so on and so forth. The last optical modem may be deployed such that it is in communication with the second seafloor observatory, as well as the previously deployed optical modem. As such, an optical communication link may be established between the first and the second seafloor observatory via multiple hops of optical modems in communication with each other. Since the range of an optical modem is limited, such an optical communication link may be preferable for short-range applications. The network may be readily reconfigurable if the UUV is adapted to retrieve the deployed optical modems and redeploy them as necessary. In some embodiments, the optical modems may be deployed to establish communication between three or more seafloor observatories. For example, if three seafloor observatories were placed in triangular formation, a single optical modem deployed at the center of the triangle may be sufficient for establishing a communication link between any two of the seafloor observatories.

Although, described with reference to optical modems 210, 310, and 410, it should be noted that the underwater optical modem-based communication system described in FIGS. 1-6 may be used in conjunction with any and all types of sensors, underwater vehicles such as UUVs, remotely operated vehicles (ROVs), and autonomous underwater vehicles (AUVs), cabled or tethered observatories, devices buried under the sea bed, tools and logging devices used underwater and under the surface of the seabed such as ROTs.

Figure 7A:
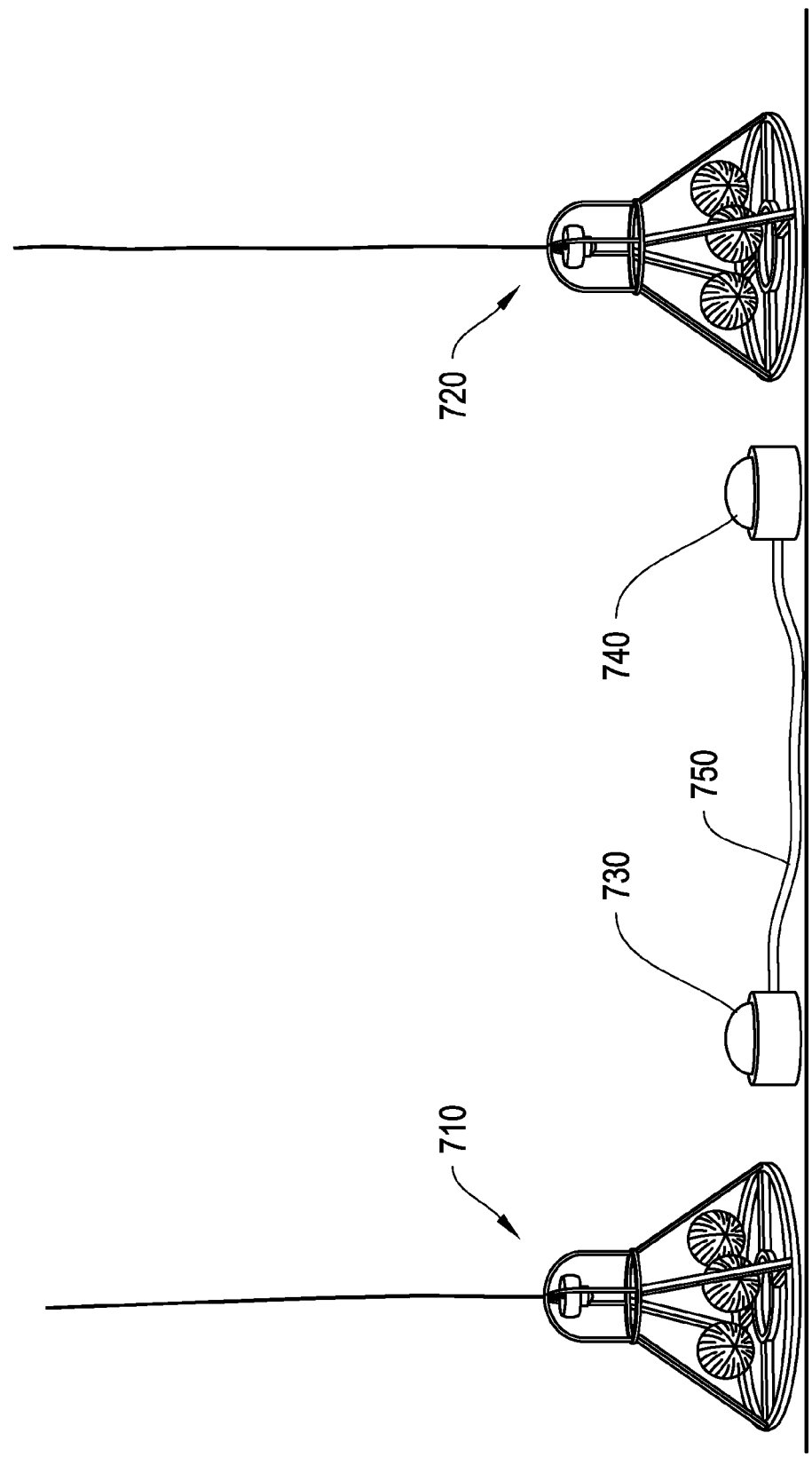
FIGS. 7A-7C illustrates a fault in an optical communication link between first and second cabled observatories, and methods for re-establishing the optical communication link in accordance with some illustrative embodiments.
Figure 7B:
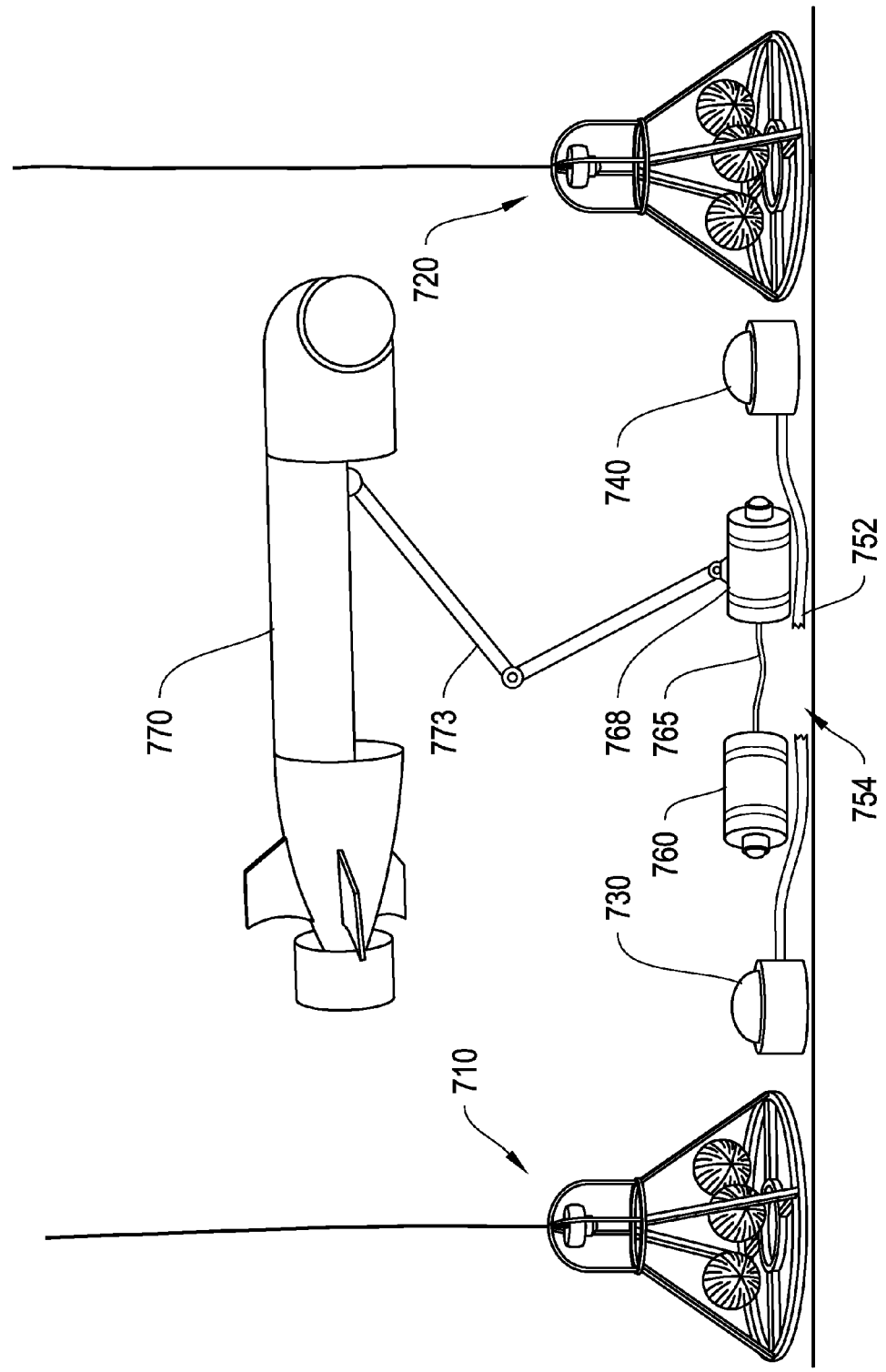
Figure 7C:
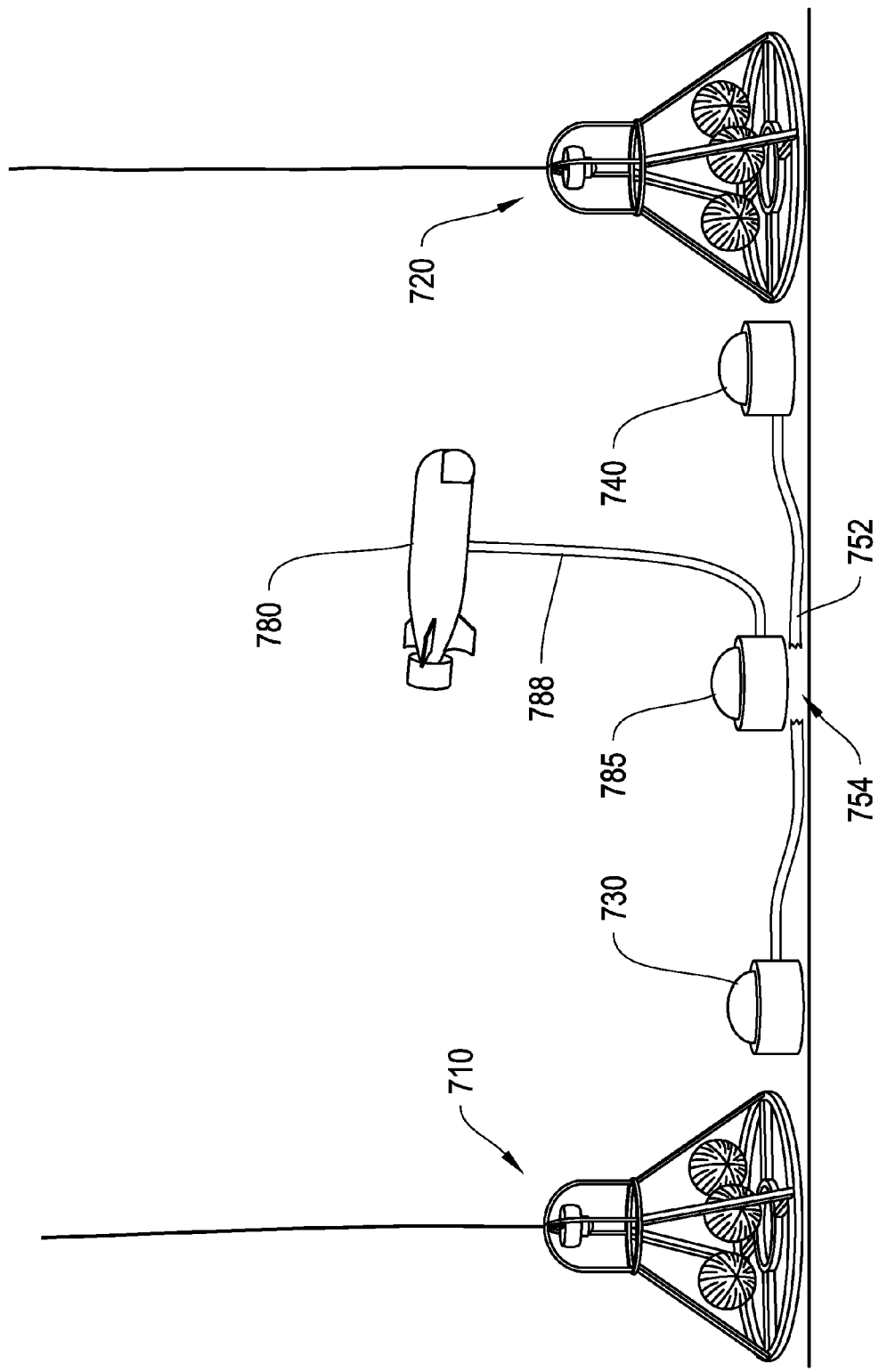

FIGS. 7A-7C illustrate an exemplary application of a reconfigurable underwater optical communication network. In particular FIGS. 7A-7C illustrate detection of a fault in an optical communication link between first and second cabled observatories, and methods for re-establishing the optical communication link in accordance with some illustrative embodiments. Shown in FIG. 7A is an example of an underwater optical communication network including a first cabled observatory 710, second cabled observatory 720, first optical modem 730, second optical modem 740 and a tether 750 mechanically coupled to the first and second optical modems. In FIG. 7B, a fault 754 has been detected in the optical network. As referred to herein, the term "fault" may refer to a malfunctioning component of the optical communications network. The fault may occur at a tether, optical modem, or any other suitable component of the optical communication network. For example, the fault is a severed tether 752.

In some embodiments, the fault is repaired and the optical communication link is re-established by disposal of optical modems near a first optical modem proximate to the fault and second optimal modem proximate to the fault. As illustrated in FIG. 7B, first optical modem 730 and second optical modem 740 are proximate to fault 754. In some implementations, to re-establish the optical communication link between cabled observatories 710 and 720, a UUV 770 may deploy a third optical modem 760 within an optical range of optical modem 730 and deploy a fourth optical modem 768 within an optical range of optical modem 740. The third and fourth optical modems may be mechanically coupled by a tether 765. Third and fourth optical modems may be configured to land on the seafloor with the diffuser and light sources pointed toward optical modems 730 and 740, respectively. UUV 770 may include a mechanical arm 773, as described above in reference to FIG. 3.

As illustrated in FIG. 7C, in some implementations, one of the disposed optical modems is a deployable unit 785, and another of the disposed optical modems is an optical modem integrated into a UUV 780. The deployable optical modem 785 and integrate optical modem of UUV 780 may be mechanically coupled by tether 788. UUV 780 may navigate to optical modem 730 and dispose optical modem 785 within an optical range of optical modem 730. UUV 780 may then navigate to and establish an optical connection with optical modem 740, thereby re-establishing a connection between optical modems 730 and 740, and cabled observatories 710 and 720.

Figure 8A:
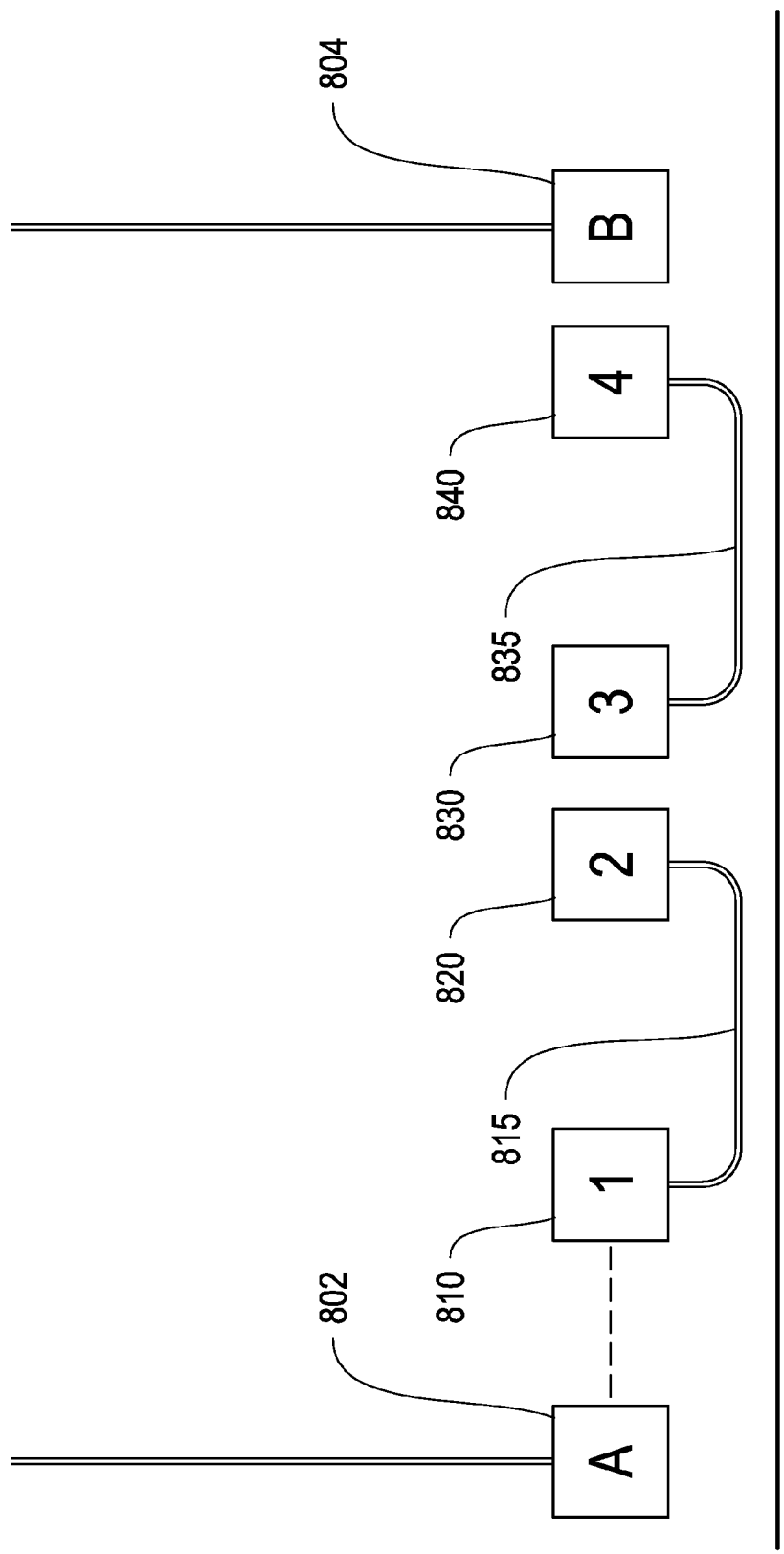
FIGS. 8A-8E illustrate detection of a fault in an underwater optical communication network and methods for re-establishing an underwater optical communication link within in the network in accordance with some illustrative embodiments.

FIGS. 8A-8E illustrate detection of a fault in an underwater optical communication network and methods for re-establishing an underwater optical communication link within in the network in accordance with some illustrative embodiments. As illustrated in FIG. 8A, an underwater optical communications network may include a first cabled observatory 802, a second cabled observatory 804, and a plurality of optical modems 810, 820, 830 and 840. Optical modem 810 is mechanically coupled to optical modem 820 via tether 815, and optical modem 830 is mechanically coupled to optical modem 840 via tether 835. It should be understood that an optical modem may be a stand-alone unit or integrated as part of a UUV as described in reference to FIGS. 2A-B, 3 and 4.

Figure 8B:
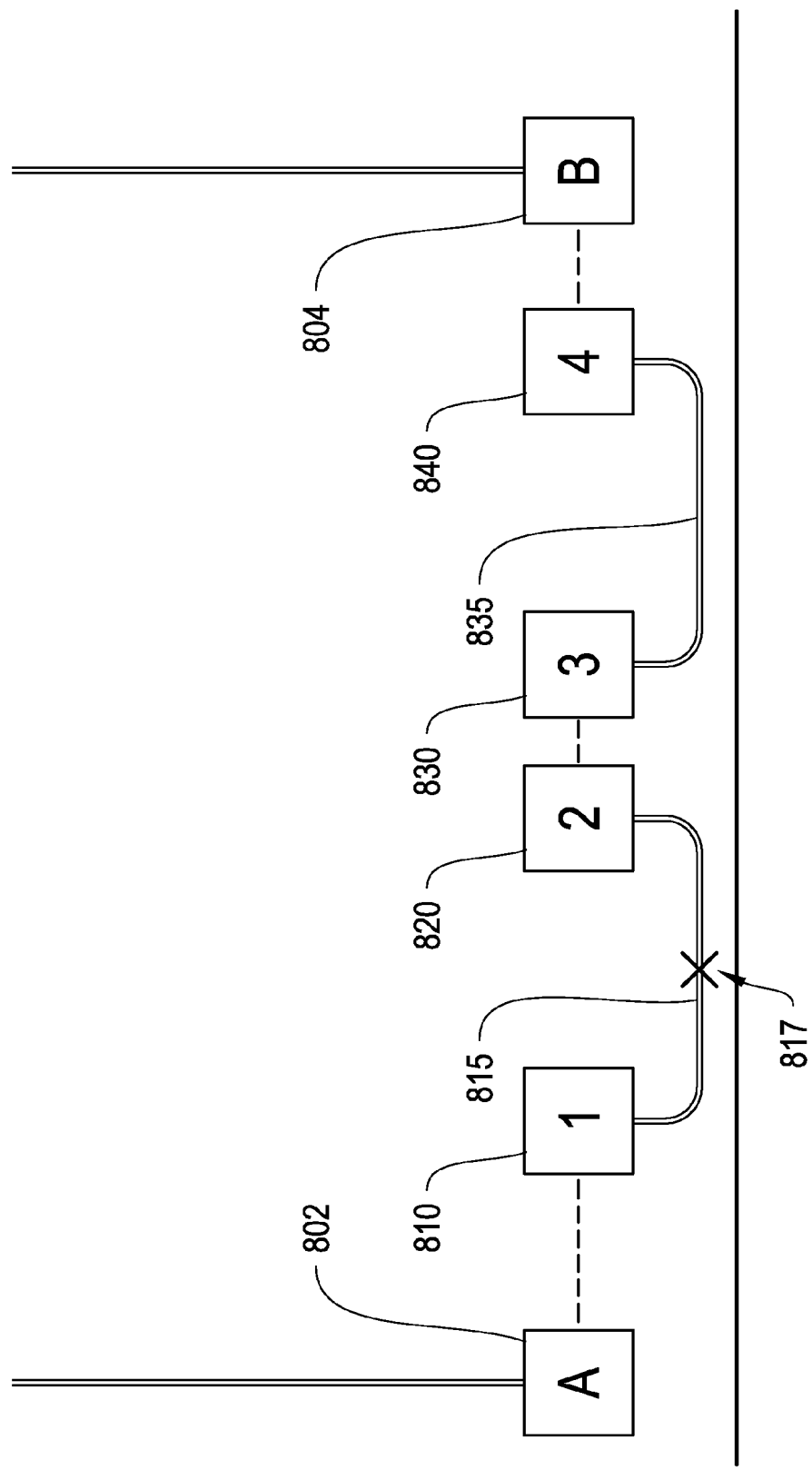

FIG. 8B illustrates a fault 817 that has occurred in the optical communication network at tether 815. A first optical modem 810 and second optical modem 820 may be determined to be proximate to the fault by network analysis. For example, each optical modem may have an associated unique network address. To determine a fault in the network, each optical modem in the network may be polled for activity and connectivity to other optical modems by one or more network controllers, which may be located within the cabled observatories, surface buoy, or any other suitable communication unit in the optical communication network. For example, a network controller may store a mapping of the optical modems in the network. The network controller may determine that there is a fault in the network at an optical modem if controller stops receiving verification of activity from a particular optical modem. For example, the network may ping or transmit a short message addressed to each optical modem and poll for an acknowledgement or response from the addressed optical modem. If there is no response from the optical modem, the network may determine that there is a fault at the optical modem. To determine first and second optical modems proximate to the fault, a network controller may retrieve the stored mapping of the optical modems in the network, and determine which optical modems of the network last communicated directly with the faulty modem.

In some implementations, the fault may be in a tether. The network controller may determine that the tether is faulty by determining that a communication path that included the tether is no longer operating. The network controller may determine a first and second optical modem proximate to the faulty tether by examining a stored network mapping and determining which optical modems last communicated across a communication path using the tether.

Figure 8C:
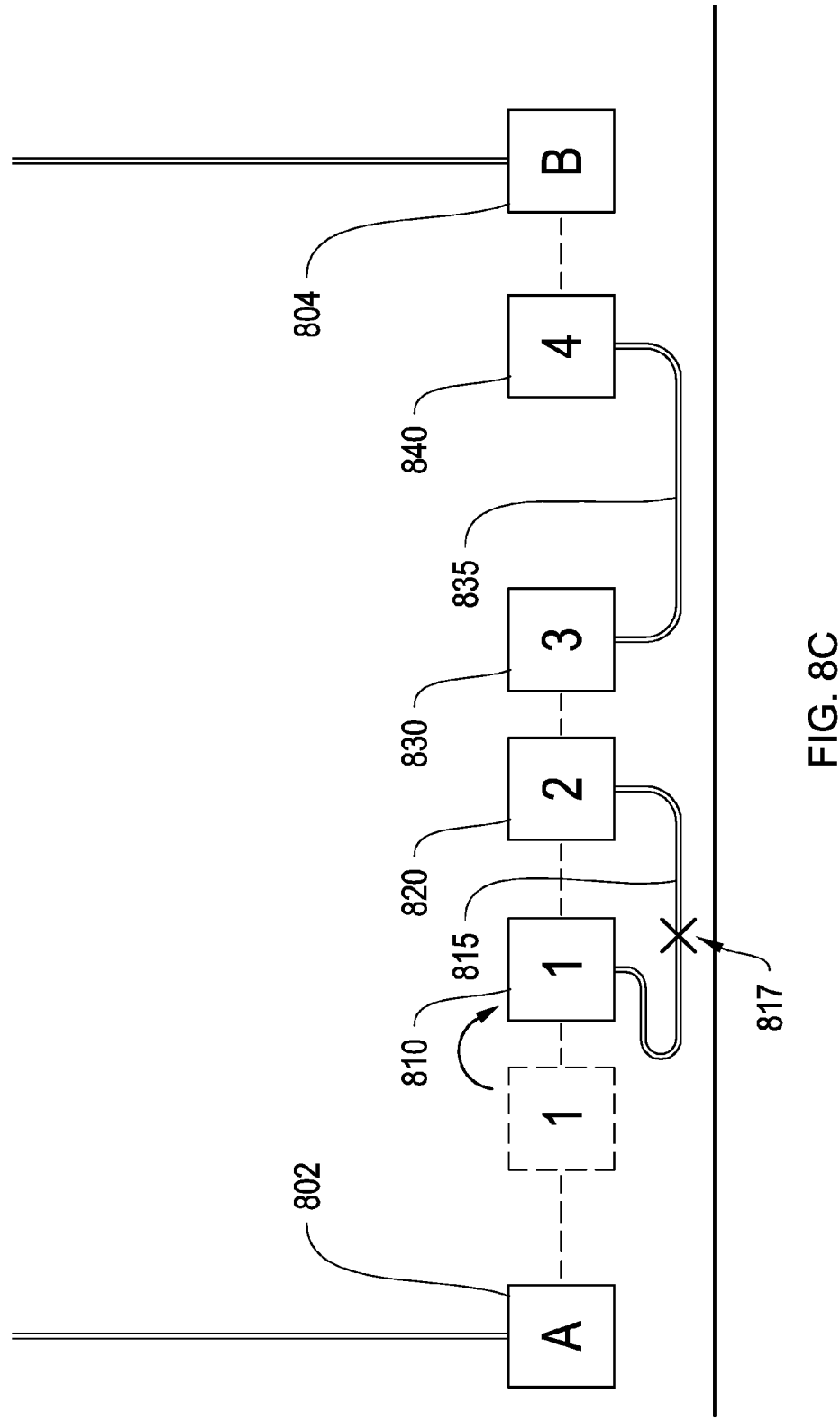
Figure 8D:
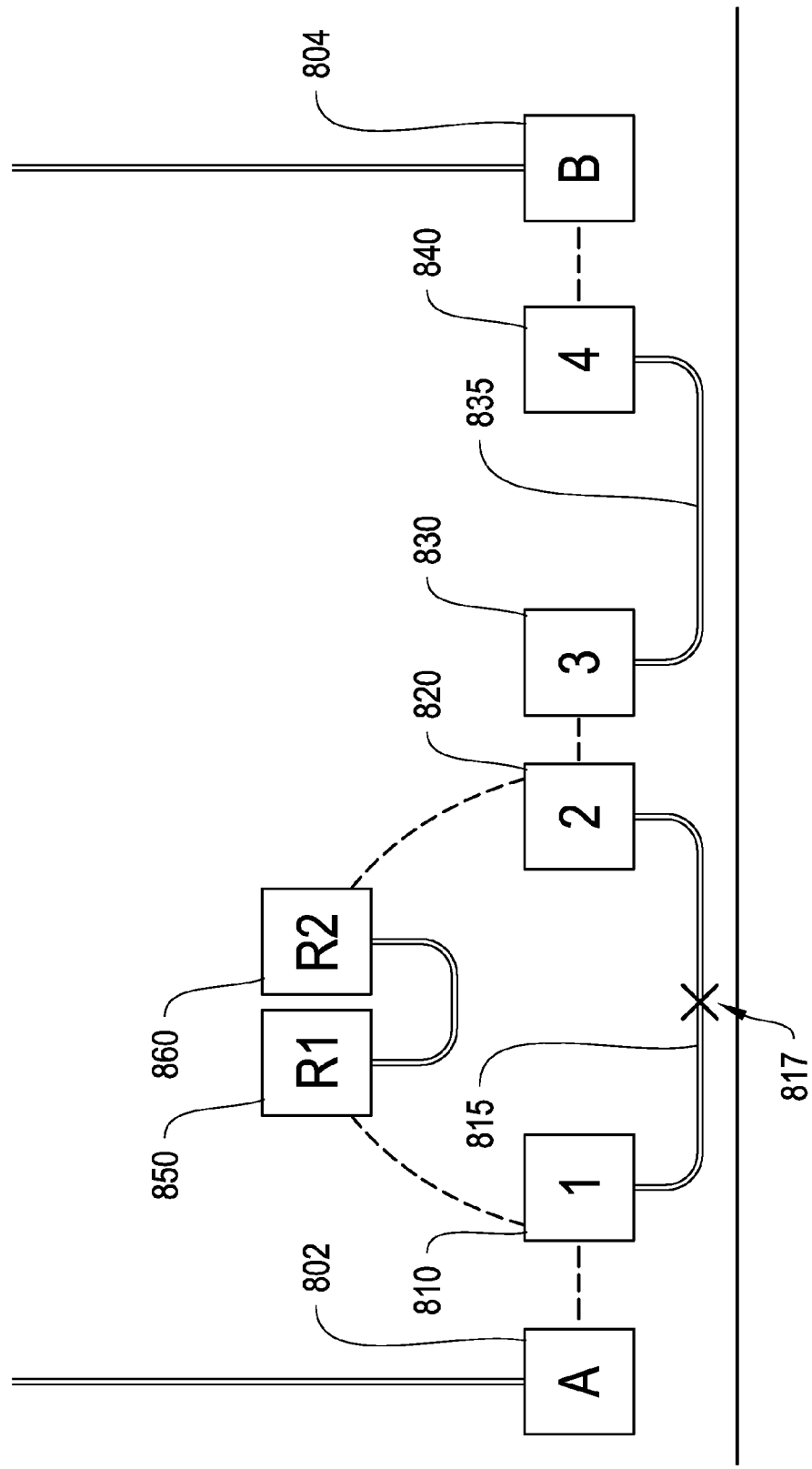

FIG. 8C illustrates a method for re-establishing an optical connection in the network. Either of the first or second optical modems proximate to the fault, or both, may be moved, such that the first and second optical modems are still within an optical range of each other, and still within an optical communication of other optical modems in the network to re-establish the optical communication link between the first and second cabled observatories 802 and 804. For example, optical modem 810 may be moved such that it is within an optical range of cabled observatory 802 and optical modem 820.

In some embodiments, the optical modems in the communication network may be spaced too far apart for the method of FIG. 8C to be effective for re-establishing an optical communication link. For example, the distance between cabled observatory 802 and optical modem 820 may be greater than the optical ranges of the observatories 810 and 820. In such scenarios, it may be possible to re-establish the optical communication link by disposing optical modems 850 and 860, mechanically coupled to each other by a mechanical tether, between optical modems 810 and 820. Optical modem 850 may be disposed within an optical range of optical modem 810, and optical modem 860 may be disposed within an optical range of optical modem 820.

In some implementations, optical modems may be deployed to replace the optical modems proximate to the fault. For example, the optical modem 850 may be disposed within an optical range of cabled observatory 802, and the optical modem 860 may be disposed within an optical range of optical modem 830. Optical modems 810 and 820 may then be retrieved for repair. For example, if optical modems 810 and 820 are integrated into a UUV, the UUV may be returned to the surface. If optical modems 810 and 820 are standalone units, they may be retrieved by a UUV (not shown), and returned to the surface of the body of water for repair.

Figure 8E:
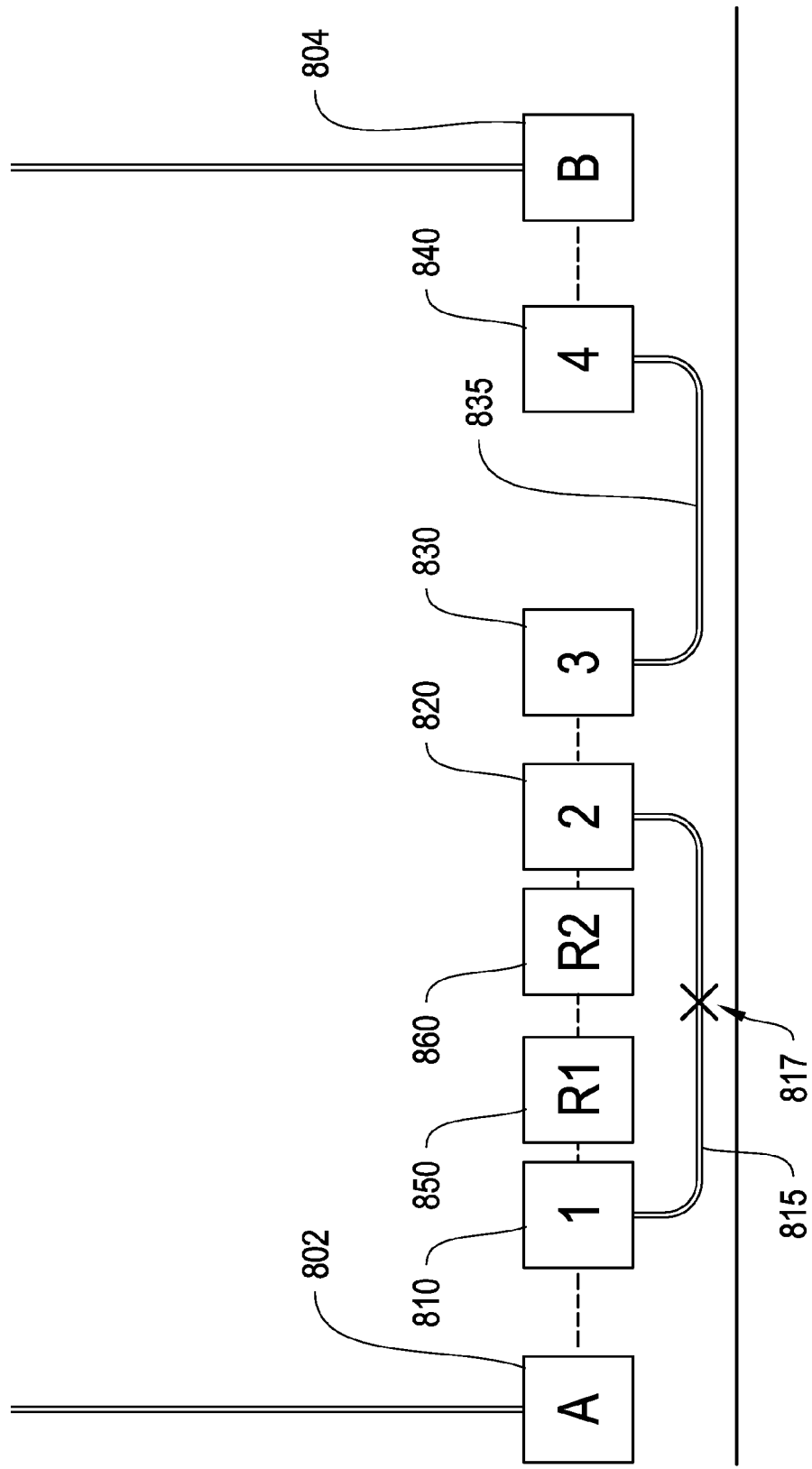

In some implementations, a plurality of optical modems may be deployed between the optical modems 810 and 820, proximate to the fault 817. The plurality of deployed optical modems may not be mechanically coupled by any tether but instead operate in a hopping optical communication link. As illustrated in FIG. 8E, optical modems 850 and 860 may be deployed between optical modem 810 and 820. At least one of the plurality of optical modems may be within an optical range of a first optical modem proximate to the fault, e.g. 810, and at least one of the plurality of optical modems may be within an optical range of a second optical modem proximate to the fault, e.g. 820. Each of the disposed optical modems may be within an optical range of at least one other disposed optical modem to maintain the hopping network. As described above in reference to FIG. 5, each optical modem may diffuse electromagnetic radiation in a plurality of directions. To avoid cross-talk among the plurality of modems, different collision avoidance protocols may be used, including TDMA, CDMA, FDMA, SDMA or any other suitable protocol as described above. In addition, each modem may communicate on a plurality of optical channels, such as a different wavelength of electromagnetic radiation.

Figure 9:
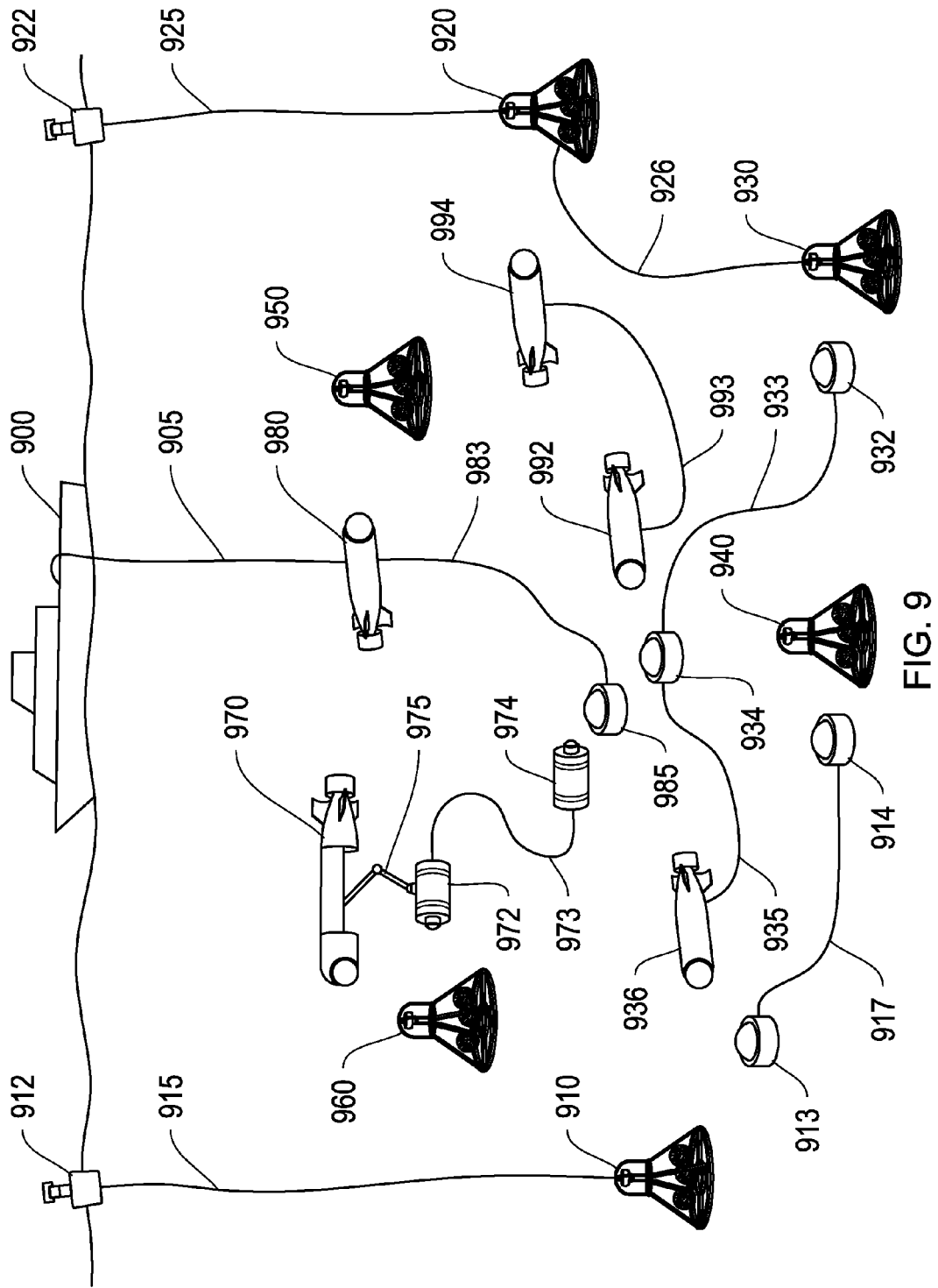
FIG. 9 illustrates an underwater optical communication network made up of a plurality of underwater optical modems and underwater vehicles in accordance with some illustrative embodiments.

FIG. 9 illustrates an underwater optical communication network made up of a plurality of underwater observatories, optical modems and vehicles in accordance with some embodiments of the present systems and methods described herein. The underwater optical communication network may be established using the methods and systems described herein. Illustrated in FIG. 9 are a plurality of underwater observatories (910, 920, 930, 940, 950 and 960), a plurality of stand-alone underwater optical modems (913, 914, 932, 934, 974, and 972), and a plurality of underwater vehicles (936, 970, 980, 992, 994). Also illustrated in FIG. 9 are various tethers (917, 933, 935, 973, 983, and 993), that mechanically couple various optical modems. Cables (905, 915, 925, and 926) are illustrated that may connect underwater observatories to surface buoys, underwater observatories to other underwater observatories, or an underwater vehicle to a surface ship 900.

Illustrated within FIG. 9 are various configurations of underwater observatories. In a first configuration, a cabled underwater observatory 910 may be connected via cable 915 to a surface buoy 912, which may reside at the surface of the water. In a second configuration, a cabled underwater observatory 920 may be connected via cable 925 to a surface buoy 912, which may reside at the surface of the water. Cabled observatory 920 may be connected via cable 926 to an underwater observatory 930. In a third embodiment, an underwater observatory may be a stand-alone unit, as illustrated by underwater observatory 940, 950 and 960.

An optical communication network may be established between the plurality of underwater observatories. Stand-alone underwater optical modem 913 may be disposed within an optical range of underwater observatory 910, stand-alone underwater optical modem 914 may be disposed within an optical range of underwater observatory 940. A tether 917 may mechanically couple underwater optical modem 913 to underwater optical modem 914. underwater optical modem 913 and underwater optical modem 914 may be deployed using a UUV as described above in reference to FIG. 3.

The network may be extended to include a plurality of nodes. As referred to herein, the term "node" may be defined as an underwater optical modem that is part of an optical communication network. underwater optical modem 932 may be deployed by a UUV 936 within an optical range of underwater observatory 930. underwater optical modem 934 may also be deployed by UUV 936 at a location different from underwater optical modem 932 to facilitate connection to other underwater optical communication links. underwater optical modem 934 may be mechanically coupled to underwater optical modem 932 by tether 933 and to UUV 936 by tether 935. UUV 936 may include an integrated optical modem that enables it to communicate with nodes in the optical communication network. For example, UUV 936 may navigate to a location within an optical range of underwater optical modem 913, and establish a an optical connection with underwater optical modem 913, thereby establishing an optical communication link between underwater observatories 910, 920, 930, and 940.

Faults in the underwater optical communication network may be repaired by reconfiguring nodes in the network. For example, a fault may be detected in tether 926, breaking the optical communication link between underwater observatory 920 and underwater observatory 930. To re-establishing an optical communication link between underwater observatory 920 and underwater observatory 930, optical modems may be deployed at nodes in the network that are connected to the underwater observatory 920 and underwater observatory 930. For example, UUV 994 and UUV 992 may each include an integrated optical modem, that may be mechanically coupled to each other by tether 993. UUV 994 may navigate to and establish an optical connection with underwater observatory 920, and UUV 992 may navigate to and establish an optical connection with underwater optical modem 934. An optical communication link may be formed between underwater observatory 930 and underwater observatory 920 through UUV 992 and UUV 994. In some embodiments, each of UUV 992 and UUV 994 is configured to deploy an optical modem (not shown), that is mechanically coupled by a tether to an integrated optical modem. For example, UUV 992 may be configured to deploy a first optical modem that is mechanically coupled by a tether to an optical modem integrated with UUV 992, which is also mechanically coupled to the integrated optical modem of UUV 994 by a tether 993. In some embodiments, the UUV 994 is configured to deploy a second optical modem that is mechanically coupled by a tether to the integrated optical modem of UUV 994, and also mechanically coupled to the integrated optical modem of UUV 992, and the first optical modem that is deployable from UUV 992.

In some embodiments, optical connections may be formed to stand-alone underwater observatories. For example, UUV 980 may deploy underwater optical modem 985 within an optical range of underwater optical modem 934. UUV 980 may include an integrated optical modem and navigate to stand-alone underwater observatory 950. The integrated optical modem of UUV 980 may be mechanically coupled to underwater observatory 985 by tether 983. UUV may be connected to a surface ship 900 by a cable 905. The cable 905 may enable remote control of underwater vehicle 980.

In some embodiments, optical connections may be formed by deploying a set of stand-alone optical modems. For example, UUV 970 may deploy underwater optical modem 974 within an optical range of 985, and deploy underwater optical modem 972 within an optical range of stand-alone underwater observatory 960. UUV 970 may deploy the underwater optical modem 972 by using a set of connectors 975, as described above in reference to FIG. 3. Underwater optical modem 972 and underwater optical modem 974 may be connected by tether 973.

As illustrated in FIG. 9, a plurality of different nodes may connected in a linear or a non-linear arrangement. As referred to herein, the term "linear arrangement" may refer to a series of optical modems that may be connected in a non-branching chain. For example, the series of underwater optical modems 914, 913, 936, 934 and 932 may be considered a linear arrangement. As referred to herein, the term "non-linear" arrangement may refer to an arrangement of optical modems that include branches. For example, the collection of underwater optical modems 972, 974, 980, 985, 934 and 932 may form a branched arrangement that extend from underwater optical modems 934, 974 and 985 as a nexus.

Those skilled in the art will know or be able to ascertain using no more than routine experimentation, many equivalents to the embodiments and practices described herein. For example, the illustrative embodiments discuss the use of UUVs, but other underwater vehicles such as remotely operated vehicles (ROVs) and autonomous underwater vehicles (AUVs) may be used with the systems and methods described herein. Accordingly, it will be understood that the systems and methods described are not to be limited to the embodiments disclosed herein, but is to be understood from the following claims, which are to be interpreted as broadly as allowed under the law.

Variations, modifications, and other implementations of what is described may be employed without departing from the spirit and scope of the systems and methods described herein. More specifically, any of the method, system and device features described above or incorporated by reference may be combined with any other suitable method, system or device features disclosed herein or incorporated by reference, and is within the scope of the contemplated systems and methods described. The systems and methods may be embodied in other specific forms without departing from the spirit or essential characteristics thereof. The foregoing embodiments are therefore to be considered in all respects illustrative, rather than limiting of the systems and methods described. The teachings of all references cited herein are hereby incorporated by reference in their entirety.

What is claimed is:

1. A method for establishing an underwater optical communication link between a first cabled observatory and a second cabled observatory, the method comprising:
   disposing a first optical modem within an optical range of the first cabled observatory, wherein the first optical modem is mechanically coupled to a second optical modem by a tether;
   disposing the second optical modem within an optical range of the second cabled observatory, wherein the second cabled observatory has a location different from that of the first cabled observatory;
   establishing an optical connection between the first cabled observatory and the second cabled observatory, through the first optical modem, the tether and the second optical modem, wherein the first optical modem and second optical modem communicate by diffusing electromagnetic radiation of wavelength in the optical spectrum between 300 nm to 800 nm;
   disposing a third optical modem within an optical range of the second cabled observatory;
   disposing a fourth optical modem within an optical range of a third cabled observatory, wherein the third cabled observatory has a location different from the first and second cabled observatories.

2. The method of claim 1, wherein at least one of the first and second optical modems is disposed using an underwater vehicle.

3. The method of claim 1, wherein the first optical modem and second optical modem communicate with the first cabled observatory and second cabled observatory using a protocol including one of time division multiple access (TDMA), code division multiple axis (CDMA), space division multiple access (SDMA) and frequency division multiple access (FDMA).

4. The method of claim 1, further comprising:
   detecting a fault in the underwater optical communication link; and
   determining if the fault occurs at the first optical modem, the second optical modem, or the tether.

5. The method of claim 4, further comprising:
   disposing a plurality of optical modems between the first optical modem and the second optical modem to re-establish the optical communication link,
   wherein at least one of the plurality of optical modems is within an optical range of the first optical modem, at least one of the plurality of optical modems is within an optical range of the second optical modem, and each optical modem of the plurality of optical modems is located within an optical range of at least one other optical modem of the plurality of optical modems.

6. The method of claim 5, wherein each of the plurality of optical modem communicates on at least two different communication channels.

7. The method of claim 4, further comprising:
   disposing a fifth optical modem within an optical range of the first cabled observatory;
   disposing a sixth optical modem within an optical range of the second cabled observatory; and
   retrieving the first and second optical modems.

8. The method of claim 1, further comprising:
   determining an optical range of the first cabled observatory; and
   determining an optical range of the second cabled observatory.

9. The method of claim 1, wherein the optical range is at least about 100 meters.

10. A system for establishing an underwater optical communication link between a first cabled observatory and a second cabled observatory, the system comprising:
    a first underwater vehicle including an integrated first optical modem;
    a second underwater vehicle including an integrated second optical modem;
    a tether mechanically coupled to the first optical modem and the second optical modem;
    wherein each of the first optical modem and second optical modem comprises:
    a transmitter having at least one optical source capable of emitting electromagnetic radiation of wavelength in the optical spectrum between 300 nm to 800 nm;
    a diffuser capable of diffusing the electromagnetic radiation and disposed in a position surrounding a portion of the at least one source for diffusing the electromagnetic radiation in a plurality of directions;
    wherein the first underwater vehicle is configured to:
    dispose a third optical modem from an underside portion of the first underwater vehicle,
    wherein the third optical modem is mechanically coupled to the first optical modem by a second tether; and retrieve the disposed third optical modem into the underside portion of the first underwater vehicle.

11. The system of claim 10 wherein the second underwater vehicle is configured to:
   dispose a fourth optical modem from an underside portion of the second underwater vehicle,
   wherein the fourth optical modem is mechanically coupled to the second optical modem by a third tether; and
   retrieve the disposed fourth optical modem into the underside portion of the second underwater vehicle.

12. The system of claim 10 wherein the first integrated optical modem is disposed on the forward surface of the first underwater vehicle, and the second integrated optical modem is disposed on the forward surface of the second underwater vehicle.

13. A method for establishing an underwater optical communication link between a first cabled observatory and a second cabled observatory, the method comprising:
   disposing a first optical modem within an optical range of the first cabled observatory, wherein the first optical modem is mechanically coupled to a second optical modem by a tether;
   disposing the second optical modem within an optical range of the second cabled observatory, wherein the second cabled observatory has a location different from that of the first cabled observatory;
   establishing an optical connection between the first cabled observatory and the second cabled observatory, through the first optical modem, the tether and the second optical modem, wherein the first optical modem and second optical modem communicate by diffusing electromagnetic radiation of wavelength in the optical spectrum between 300 nm to 800 nm;
   detecting a fault in the underwater optical communication link;
   determining if the fault occurs at the first optical modem, the second optical modem, or the tether;
   disposing a third optical modem within an optical range of the first optical modem; and
   disposing a fourth optical modem within an optical range of the second optical modem, wherein the third optical modem and fourth optical modem are mechanically coupled by a second tether.

* * * * *

UNITED STATES PATENT AND TRADEMARK OFFICE
CERTIFICATE OF CORRECTION

| | | |
|---|---|---|
| PATENT NO. | : 8,953,944 B2 | Page 1 of 1 |
| APPLICATION NO. | : 13/344430 | |
| DATED | : February 10, 2015 | |
| INVENTOR(S) | : Casey Machado et al. | |

It is certified that error appears in the above-identified patent and that said Letters Patent is hereby corrected as shown below:

Specification

In Column 1, before "Background" the following should be inserted:

--STATEMENT OF RIGHTS TO INVENTIONS MADE UNDER FEDERALLY SPONSORED RESEARCH
This invention was made with Government support under OCE0942835 awarded by the National Science Foundation. The Government has certain rights in this invention.--

Signed and Sealed this
Thirty-first Day of May, 2016

Michelle K. Lee
*Director of the United States Patent and Trademark Office*